United States Patent
Cvijetic et al.

(10) Patent No.: US 9,160,480 B2
(45) Date of Patent: Oct. 13, 2015

(54) SYMMETRIC COHERENT OFDMA-PON CONFIGURATION WITH LOW-SPEED ONU-SIDE

(75) Inventors: Neda Cvijetic, Plainsboro, NJ (US); Milorad Cvijetic, Tucson, AZ (US); Ming-Fang Huang, Atlanta, GA (US); Ezra Ip, Plainsboro, NJ (US); Ting Wang, W. Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 765 days.

(21) Appl. No.: 13/470,425

(22) Filed: May 14, 2012

(65) Prior Publication Data
US 2012/0294614 A1    Nov. 22, 2012

Related U.S. Application Data

(60) Provisional application No. 61/487,037, filed on May 17, 2011.

(51) Int. Cl.
*H04J 14/00* (2006.01)
*H04J 14/02* (2006.01)

(52) U.S. Cl.
CPC ........... *H04J 14/0282* (2013.01); *H04J 14/002* (2013.01)

(58) Field of Classification Search
CPC . H04J 14/0282; H04J 14/025; H04J 14/0246; H04J 14/0298; H04J 14/0252; H04J 14/0247; H04J 14/0265; H04J 2014/0253; H04J 14/002; H04J 14/0232; H04J 14/02; H04L 27/2697; H04L 5/0007; H04L 27/2602; H04L 12/2861; H04B 10/548; H04B 10/272; H04B 10/61; H04B 10/40; H04B 10/25754

USPC ............ 398/66, 67, 70–72, 74, 79, 202, 205, 398/208, 115
See application file for complete search history.

(56) References Cited

U.S. PATENT DOCUMENTS

| | | | | |
|---|---|---|---|---|
| 5,367,397 | A * | 11/1994 | Tajima | 398/137 |
| 7,526,211 | B2 * | 4/2009 | Mcnicol et al. | 398/204 |
| 7,978,975 | B2 * | 7/2011 | Qian et al. | 398/69 |
| 8,064,775 | B2 * | 11/2011 | Yu et al. | 398/187 |
| 8,374,508 | B2 * | 2/2013 | Soto et al. | 398/115 |
| 8,472,813 | B2 * | 6/2013 | Cvijetic et al. | 398/205 |
| 8,682,164 | B2 * | 3/2014 | Tien et al. | 398/72 |

(Continued)

OTHER PUBLICATIONS

A Novel OFDMA-PON Architecture With Source-Free ONUs for Next-Generation Optical Access Networks Dayou Qian, Neda Cvijetic, Junqiang Hu, and Ting Wang. published Sep. 1, 2009.*

*Primary Examiner* — Hibret Woldekidan
(74) *Attorney, Agent, or Firm* — Joseph Kolodka

(57) ABSTRACT

A method by an optical network unit ONU includes, for downstream transmission, using a first tunable laser for coherent detection on a sub-band basis to increase receiver sensitivity and reduce analog-to-digital conversion ADC and digital signal processor DSP requirements within the ONU, and for upstream transmission, using a second tunable laser and using an optical signal beating between the first and second tunable lasers to generate a tunable radio frequency RF signal source for upstream multi-band OFDMA signal generation thereby avoiding need for an otherwise more costly RF clock source within the ONU, enabling low-speed digital-to-analog conversion DAC operation and rendering the ONU colorless in both optical and radio frequency RF domains.

11 Claims, 3 Drawing Sheets

(56) References Cited

U.S. PATENT DOCUMENTS

| | | | |
|---|---|---|---|
| 8,897,648 B2* | 11/2014 | Cvijetic et al. | 398/115 |
| 9,002,204 B2* | 4/2015 | Cvijetic et al. | 398/70 |
| 9,014,568 B2* | 4/2015 | Qian et al. | 398/159 |
| 2004/0208642 A1* | 10/2004 | Chen et al. | 398/186 |
| 2009/0274462 A1* | 11/2009 | Yu | 398/68 |
| 2010/0028002 A1* | 2/2010 | Qian et al. | 398/79 |
| 2010/0150566 A1* | 6/2010 | Soto et al. | 398/115 |
| 2010/0215368 A1* | 8/2010 | Qian et al. | 398/67 |
| 2011/0222854 A1* | 9/2011 | Roberts et al. | 398/70 |
| 2012/0236774 A1* | 9/2012 | Guey et al. | 370/312 |
| 2012/0269515 A1* | 10/2012 | Cvijetic et al. | 398/72 |
| 2014/0241717 A1* | 8/2014 | Cvijetic et al. | 398/48 |

* cited by examiner

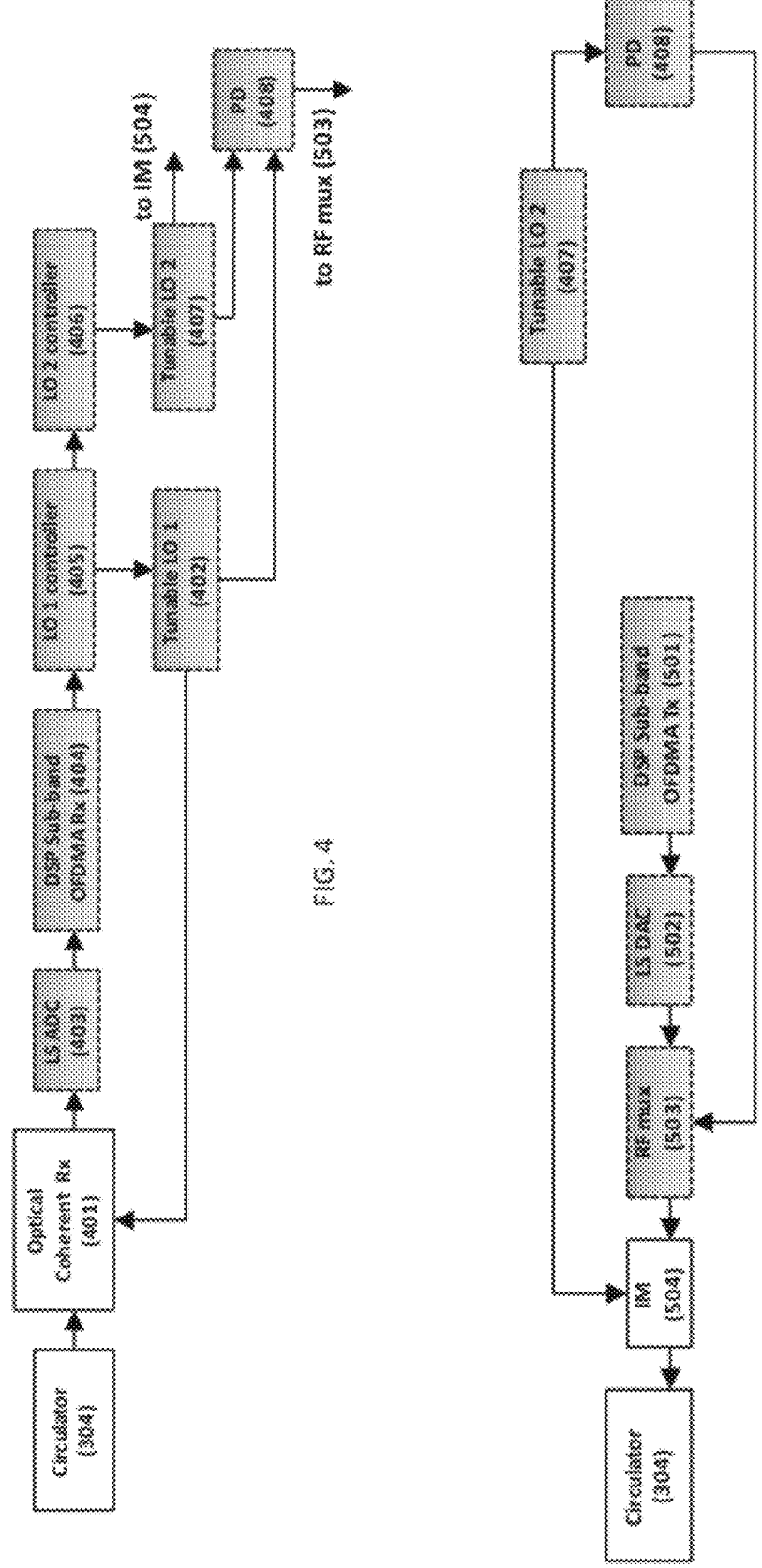

SYMMETRIC COHERENT OFDMA-PON CONFIGURATION WITH LOW-SPEED ONU-SIDE

RELATED APPLICATION INFORMATION

This application claims priority to provisional application Ser. No. 61/487,037 filed on May 17, 2011, the contents thereof are incorporated herein by reference.

BACKGROUND

The present invention relates to optical communications and, more particularly, to a symmetric coherent orthogonal frequency-division multiple access-passive optical network (OFDMA-PON) configuration with low speed optical network unit-side ONU-SIDE.

Orthogonal frequency-division multiplexing (OFDM) based passive optical network (PON) has emerged as an attractive solution and a candidate technology for next-generation fiber-optic access systems. Due to the strict cost constraints in such systems, especially from the optical network unit (ONU) side, direct photodetection has been employed to simplify optical hardware. However, in future PON, transmission speeds are expected to grow to $40^+$ Gb/s, while transmission distances and required ONU counts per fiber are also expected to at least double. Consequently, direct (non-coherent) photodetection will likely impose sensitivity limits on ONU-side optical signal reception that may render it unsuitable for certain future PON applications. Moreover, in the context of OFDM-PON ONUs, achieving $40^+$ Gb/s speeds with direct photodetection requires high-speed analog-to-digital and digital-to-analog (ADC/DAC) components, as well as high-speed digital signal processors (DSP). For certain applications, the high-speed ADC/DAC and digital signal processing DSP requirements can prohibitively increase both ONU cost and power consumption.

Various flavors of wavelength division multiplexed (WDM)-PON have been proposed to solve the problems described above. In classical WDM-PON, the problem is addressed by replacing passive splitters in the fiber network with WDM multiplexers and demultiplexers, and assigning each user a dedicated wavelength pair $\lambda_{i, DS}/\lambda_{i, US}$ for downstream/upstream transmission. However, this approach would require dramatic and expensive changes to the deployed fiber distribution network. Moreover, the transmission speed on each wavelength would be limited to 1.25 Gb/s and the approach would prevent statistical bandwidth sharing to reduce wasted bandwidth resources.

A second type of WDM-PON that has been proposed removes the need for WDM multiplexer/demultiplexer installation by exploiting an ONU-side tunable laser to lock onto the upstream wavelength $\lambda_{i, US}$ based on the downstream wavelength reference $\lambda_{i, DS}$ that is pre-assigned at the optical line terminal (OLT). This tuning and locking feature is known already. In this way, colorless WDM operation is achieved without the need for reflective ONU-side optical devices or a fiber distribution network overhaul. Moreover, the use of the ONU-side tunable laser enables ONU-side coherent detection, which increases optical receiver sensitivity. However, to enable low speed ADC/DACs and DSP, this configuration also limits the transmission speed on each wavelength and prevents statistical bandwidth sharing among different ONUs in the PON. Consequently, speed limitations and bandwidth inefficiency are not solved by this approach.

Finally, in applicant's previous work, a source-free configuration with OLT-side coherent detection has been proposed for $40^+$ Gb/s/$\lambda$ transmission with increased sensitivity. However, in this architecture, either high-speed ADC/DAC/DSP and/or expensive radio frequency (RF) clock sources were needed. Moreover, in the case of RF clock source use, different ONUs would need to have different pre-assigned clock frequencies. Consequently, the ONUs were not truly colorless (i.e. frequency independent) in the electronic domain, which is highly impractical from the deployment and management perspectives.

Accordingly, there is a need for a solution, that overcomes the above problems and challenges, wherein the receiver sensitivity limits and high-speed ADC/DAC and DSP requirements mandated by direct photodetection would thus be valuable for future OFDM-based PON, both from performance and cost perspectives.

SUMMARY

A method by an optical network unit ONU includes, for downstream transmission, using a first tunable laser for coherent detection on a sub-band basis to both increase receiver sensitivity and reduce analog-to-digital conversion (ADC) and digital signal processor (DSP) requirements within the ONU, and for upstream transmission, using a second tunable laser and using an optical signal beating between the first and second tunable lasers to generate a tunable radio frequency (RF) signal source for upstream multi-band OFDMA signal generation thereby avoiding need for an otherwise more costly RF clock source within the ONU, enabling low-speed digital-to-analog conversion DAC operation and rendering the ONU colorless in both optical and radio frequency RF domains.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 4 is a block diagram detailing the dual-laser tunable coherent receiver RX shown in FIG. 1, in accordance with the invention.

FIG. 5 is a block diagram detailing the dual laser tunable RF transmitter Tx shown in FIG. 1, in accordance with the invention.

DETAILED DESCRIPTION OF PREFERRED EMBODIMENTS

The invention is directed to using two ONU-side tunable lasers, multi-band OFDMA signaling, and coherent ONU-side photodetection to enable receiver sensitivity gains and low-speed ADC/DAC/DSP operation while also achieving $40^+$ Gb/s per-wavelength speeds as well as statistical bandwidth sharing among all ONUs in the PON. For downstream transmission, multi-band OFDMA signaling—wherein a 40+ Gb/s OFDMA signal is composed of several lower-rate sub-bands—and the use of a tunable ONU-side laser are exploited for coherent detection on a sub-band basis, which both increases receiver sensitivity and reduces ADC and DSP requirements. For upstream transmission, optical signal beating between the two ONU-side lasers is used to generate a tunable radio frequency (RF) signal source for upstream multi-band OFDMA signal generation, obviating the need for expensive RF clock sources at the ONUs, enabling low-speed DAC operation, and rendering the ONU colorless both in the optical and RF domains. The use of two tunable lasers in the ONU in the proposed configuration also achieves an efficient and flexible downstream/upstream wavelength plan, without imposing the per-wavelength speed limitations present in the prior art or requiring optical source distribution from the OLT.

Figure 1:
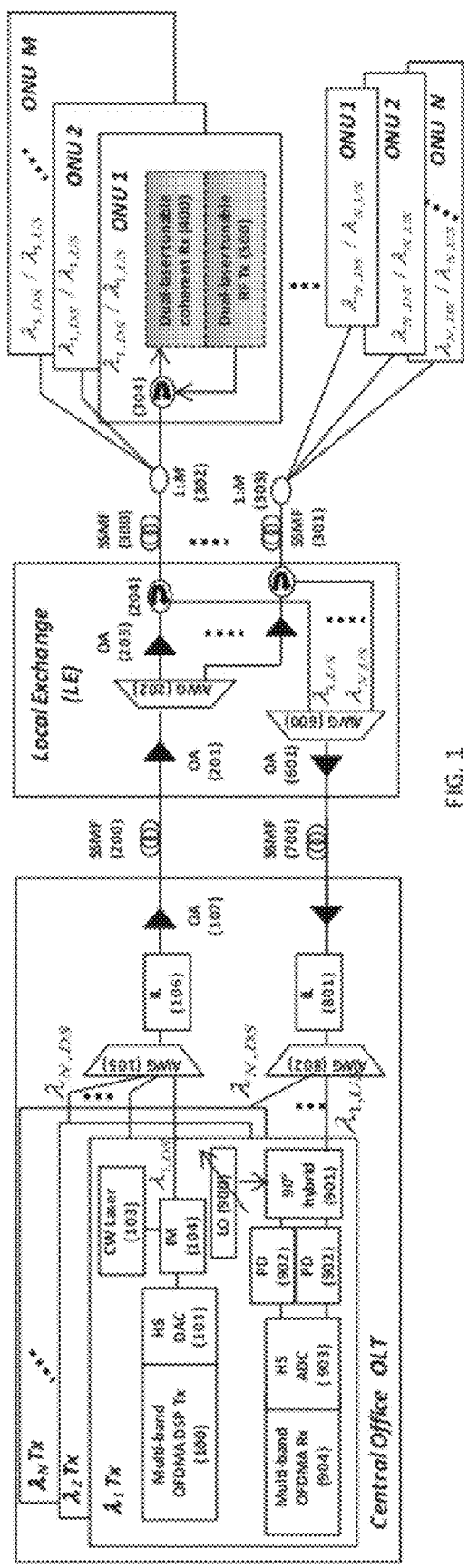
FIG. 1 is a block diagram of an exemplary coherent WDM-OFDM-PON configuration with ONE-side low-speed (LS) ADC/DACs enabled by dual tunable laser ONUs, in accordance with the invention.

Referring now to the block diagram of FIG. 1, there is shown an exemplary symmetric coherent OFDM-PON configuration, generalized to a wavelength division multiplexed (WDM) environment. At the central office OLT, a multi-band OFDMA signal is generated in the multi-band OFDMA digital signal processor DSP Tx (100) and converted directly to a radio frequency RF using a high-speed (RS) DAC. This direct-to-RF conversion obviates the need for lossy multi-stage analog RF combining to improve signal quality. A single wavelength optical multi-band OFDMA signal with wavelength. $\lambda_{1,DS}$ is produced by an optical intensity modulator (IM) (104) and a continuous wave (CW) laser source (103).

An arrayed waveguide grating (AWG) (105) can next be used to combine A such downstream signals to create a WDM-OFDMA downstream signal on wavelengths $\lambda_{1,DS}$ to $\lambda_{N,DS}$. An optical interleaver (IL) (106) is used to generate a single sideband optical WDM-OFDMA signal. Following optical amplification (OA) (107), the WDM-OFDMA signal is transmitted over standard single mode fiber (SSMF) (200), optically amplified (201), and wavelength-separated by another AWG (202). An OA (203) and an optical circulator (204) are used to amplify the downstream signal on $\lambda_{1,DS}$ and route it to a second SSMF stage (300) and a 1:M passive optical splitter (302), where M denotes the number of ONUs in the OFDMA-PON. This amplification and routing are performed for all N downstream wavelengths, as shown in FIG. 1. It is noted that all M ONUs in each OFDMA-PON operate on one downstream wavelength, $\lambda_{i,DS}$, i=1, ... N, which enables statistical bandwidth sharing in the electronic domain. Finally, another circulator (304) is used to route the downstream signal to the dual-laser tunable coherent receiver (Rx) (400) in each ONU.

After processing in (400) and upstream OFDMA signal generation in the dual-laser tunable RF transmitter (Tx) (500), the upstream OFDMA signals on $\lambda_{1,US}$ from M ONUs are routed back through (304), (302), (300), and (204) to an AWG (600), which combines the upstream signals on all upstream wavelengths, $\lambda_{i,US}$, i=1, ... N. Following optical amplification (601), SSMF transmission (700), and optical single sideband filtering using an IL (801), the upstream WDM-OFDMA signal is separated into its constituent wavelengths by an AWG (802). The upstream signal on each wavelength is then received by a OLT-side coherent receiver, consisting of a tunable local oscillator (LO) laser (900), 90 degree hybrid (901), and an array of two or more photodiodes (PDs) (902). The photodetected signal on each wavelength is next digitized using a high-speed (HS) ADC (903) and the data is recovered in the multi-band OFDMA Rx (904).

The innovative features in the exemplary configuration of FIG. 1 that are not known from prior art are the ONU-side dual-laser tunable coherent Rx (400) and dual-laser tunable RF Tx (500). Since these are the key enablers of the invention, their operation is detailed next.

Figure 2:
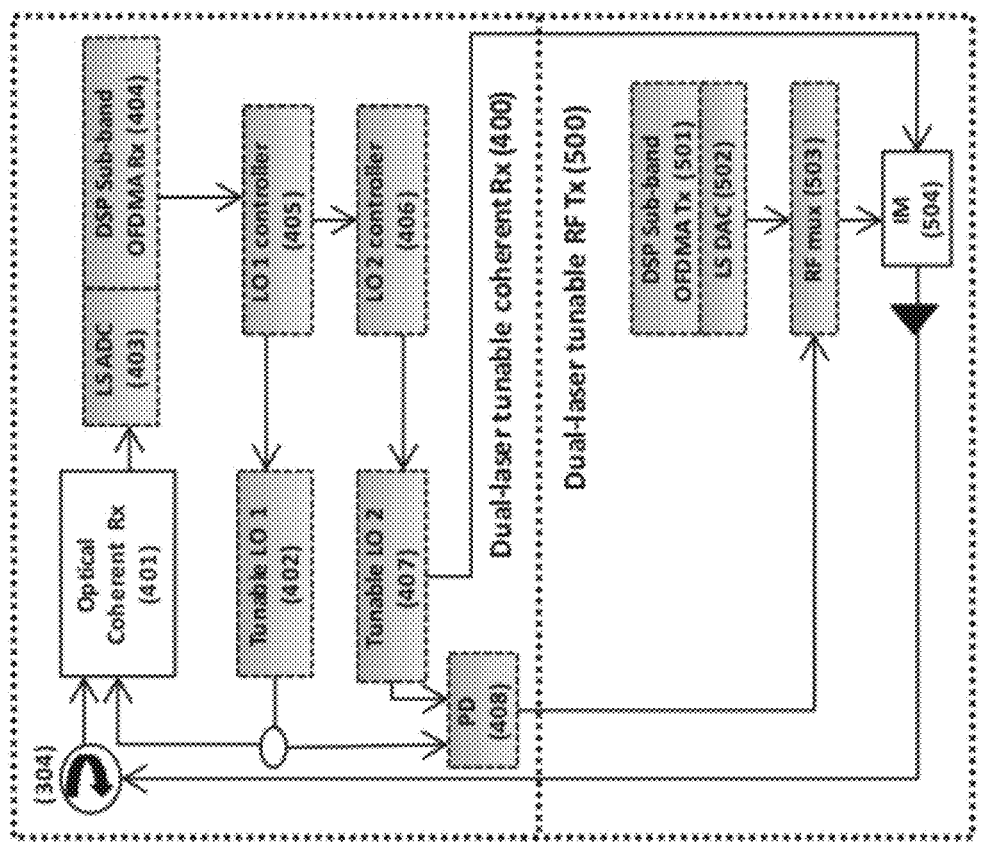
FIG. 2 is a block diagram of a dual-laser tunable ONU coherent receiver Rx and tunable RF transmitter Tx shown in FIG. 1 in accordance with the invention.

The detailed operation of (400) and (500) is shown in FIG. 2 for the downstream wavelength $\lambda_{1,DS}$, without loss of generality. The dual-laser tunable ONU coherent Rx (400) is described first. The downstream multi-band OFDMA signal is routed via the circulator (304) to a coherent optical receiver (Rx) (401). To recover only one of several possible OFDMA sub-bands in the multi-band OFDMA signal, the wavelength of the tunable local oscillator LO 1 (402) is frequency-shifted using the LO 1 controller (405). The amount of the needed frequency shift can be communicated to each ONU by the OLT, and then communicated to the LO 1 controller by the DSP single-band Rx (404), prior to data transmission. Following coherent detection (401), the desired OFDMA sub-band is next digitized by a low-speed (LS) ADC (403) and processed in the DSP sub-band OFDMA Rx (404). In this way, both the downstream ADC and DSP requirements are significantly reduced through the use of the tunable LO 1 (402).

Next, to enable upstream transmission on the upstream wavelength $\lambda_{1,US}$, an output signal from the LO 1 controller (405) is applied to the LO 2 controller (406) based on which the LO 2 controller determines and fixes the wavelength of the second ONU-side laser, tunable LO 2 (407). This wavelength of the tunable LO 2 thus becomes the upstream transmission wavelength $\lambda_{1,US}$, which will be offset in frequency from $\lambda_{1,DS}$ by a frequency shift determined by the LO 2 controller (406). Finally, to generate a tunable RF signal needed for upstream transmission, the outputs of tunable LO 1 (402) and tunable LO 2 (407) are jointly photodetected by a photodiode (408). By beating the two tunable laser signals in this way, a tunable RF signal for RF upconversion of the upstream OFDMA signal is achieved without requiring an expensive RF clock source. Moreover, since the frequency of the tunable RF signal does not have to be pre-determined and does not require manual tuning, GNU operation now becomes colorless (i.e. frequency independent) both in the RF and optical domains.

Given the operation of dual-laser tunable coherent receiver Rx (400), the dual-laser tunable RF Tx (500) operates as follows: a sub-band digital baseband OFDMA signal is first generated in the DSP Tx (501). Due to baseband DSP signal generation, a low-speed (LS) DAC (502) can be used for digital-to-analog conversion. To accomplish RF upconversion, needed for upstream multi-band OFDMA operation, the output of the LS DAC (502) is combined with the RF signal output of (408) by a RF mux (503). The upstream optical OFDMA signal is then generated by applying the RF mux output (503) and the tunable LO 2 signal output (407) to an optical intensity modulator (IM) (504). The IM (504) output can then be amplified and is routed upstream via the ONU circulator (304). It can thus be appreciated that the proposed dual-laser approach notably reduces DSP and DAC requirements of the upstream transmitter (500).

Figure 3:
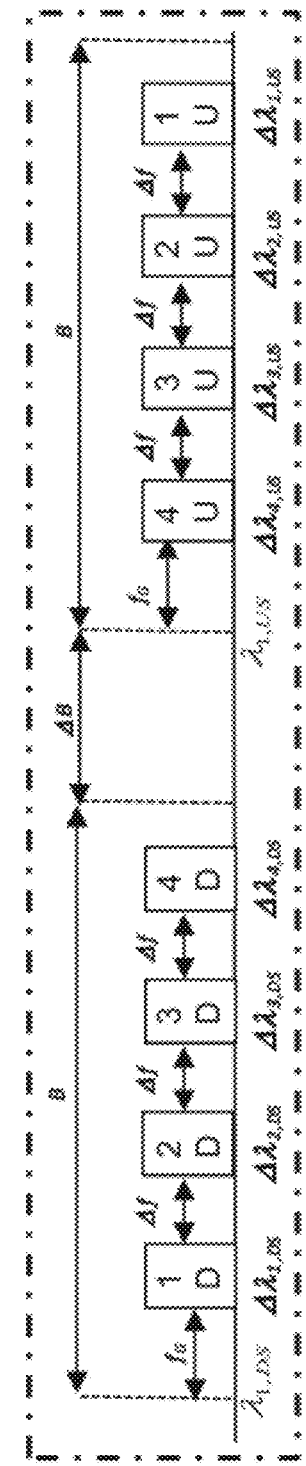
FIG. 3 is a diagram of downstream and upstream wavelength plan for the WDM-OFDM-PON of FIG. 1, in accordance with the invention.

The diagram of FIG. 3 illustrates a realization of the flexible downstream and upstream wavelength plan enabled by the proposed dual-laser tunable Rx (400) and (500) for the wavelength pair $\lambda_{1,DS}/\lambda_{1,US}$ without loss of generality. A multi-band OFDMA signal composed of four sub-bands is used for illustrative purposes, also without loss of generality. Focusing first on the downstream spectrum, the multi-band OFDMA signal consists of sub-bands 1D, 2D, 3D, 4D, offset from the downstream wavelength $\lambda_{1,DS}$ by a frequency shift $f_G$, featuring an inter sub-band frequency separation $\Delta f$, and end-to-end bandwidth B. This signal can be generated by direct baseband-to-RF conversion in the OLT-side multi-band DSP Tx (100) and high-speed DAC (101). To accomplish single sub-band coherent detection at each ONU, the LO 1 controller (405) will tune the wavelength of tunable LO 1 (402) to $\Delta\lambda_{j,DS}$, j=1, 2, 3, 4, depending on the target sub-band. For example, to recover sub-band 4D, the wavelength of tunable LO 1 (402) will be set to $\Delta\lambda_{4,DS}$. The wavelength of tunable LO 2 (407) will then be set to $\lambda_{1,US}$ by the LO 2 controller (406), such that it is offset from the downstream wavelength $\lambda_{1,DS}$ by a frequency shift of (B+$\Delta$B) as shown in FIG. 3. The outputs of tunable LO 1 (402) and LO 2 (407) beat together in the PD (408) to produce a tunable RF signal at difference frequency corresponding to $\Delta\lambda_{j,US}=(\lambda_{1,US}-\Delta\lambda_{j,DS})$ j=1, 2, 3, 4. Consequently, at the output of the ONU IM (504), an optical OFDMA signal composed of one of four possible upstream sub-bands—1U, 2U, 3U, or 4U—will be created, as shown in FIG. 3. For example, if the downstream receiver (400) selects sub-band 4D, the difference frequency corresponding to ($\lambda_{1,US}-\Delta\lambda_{4,DS}$) will be small and the upstream transmitter will generate an optical OfDMA signal consisting of sub-band 4U; the opposite will be the case with sub-bands 1D and 1U, for example. In this way, a flexible, non-interfering downstream/upstream wavelength plan is generated that also enables notably higher GNU data rates than what has been demonstrated in prior art.

Key aspects of the dual-laser tunable coherent Rx (400) are shown in FIG. 4. The inventive features are denoted by the shaded, dashed rectangles. As seen in FIG. 4, after (304), the coherent Rx (401) combines with the inventive feature (402) to enable the inventive features (403), a low-speed (LS) ADC, and a reduced-complexity DSP sub-band OFDMA Rx (404). Inventive feature (405) controls the operation of (402) and also provides a control signal to the LO controller (406). The inventive feature (406) in turn controls the operation of the second tunable LO (407). Finally, (402) and (407) are used as inputs to the PD (408), which produces the tunable RF signal for upstream transmission. As shown in FIG. 4, (407) is also used as an input to the upstream intensity modulator (IM) (504) and the output of (408) is used as input to the RF mux (503). These relationships are the features that couple the dual-laser tunable coherent Rx (400) to the dual-laser tunable RF Tx (500).

Key aspects of the dual-laser tunable coherent RF Tx (500) are shown in FIG. 5. The inventive features are denoted by the shaded, dashed rectangles. As seen in FIG. 5, the inventive features (407) and (408) enable the reduced-complexity DSP single-band OFDMA Tx (501), as opposed to a higher complexity multi-band OFDMA Tx. Moreover, the low-speed (LS) DAC (502) is likewise enabled by the same principles. As mentioned above, the output of feature (408) provides a tunable RF signal to the RF multiplexer (503), which combined with the output of (502), generates an RF upconverted sub-band OFDMA signal for upstream transmission. The output of feature (503) and the output of (407) are used as inputs to the optical IM (504) to generate an optical sub-band OFDMA signal. The output of (504) is then routed upstream via the circulator (304).

From the above it can be seen that the present invention is advantageous in that it removes the need for high-speed ONU-side ADC, DAC, and DSP, removes the need for expensive, pre-tuned RF clock sources, and increases optical receiver sensitivity to enable higher transmission reach and ONU counts per PON. The overall ONU complexity and cost can thus be reduced while preserving 40$^+$ Gb/s/$\lambda$ speeds and exploiting the advantages of statistical bandwidth sharing among ONUs to increase bandwidth efficiency. Moreover, the ONUs are rendered colorless both in the optical and electronic domains, which greatly increases their practicality in terms of production, deployment, and management. Finally, the proposed solution enables an efficient and flexible downstream/upstream wavelength plan, without imposing the per-wavelength speed limitations present in the prior art or requiring optical source distribution from the OLT.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method by an optical network unit ONU comprising the steps of:
   i) for downstream transmission, using a first tunable laser for coherent detection on a sub-band basis to increase receiver sensitivity and reduce analog-to-digital conversion (ADC) and digital signal processor (DSP) requirements within said ONU; and
   ii) for upstream transmission, using a second tunable laser and using an optical signal beating between said first and second tunable lasers to generate a tunable radio frequency RF signal source for upstream multi-band orthogonal frequency-division multiple access (OFDMA) signal generation thereby avoiding an RF clock source within said ONU, as well as enabling digital-to-analog conversion (DAC) operation and rendering said ONU colorless in both optical and radio frequency RF domains;
   wherein step i) comprises a downstream multi-band OFDMA signal being routed via a circulator to a coherent optical receiver (Rx) and to recover one or more of several possible OFDMA sub-bands in the multi-band OFDMA signal, a wavelength of a first tunable local oscillator LO 1 is frequency-shifted using a first local oscillator LO 1 controller;
   wherein an amount of needed frequency shift for said first tunable local oscillator LO 1 is communicated to each said ONU by an optical line terminal OLT, and then communicated to said first local oscillator LO 1 controller by a digital signal processor DSP sub-band receiver Rx, prior to data transmission.

2. The method of claim 1, wherein following coherent detection a desired OFDMA sub-band is next digitized by an analog-to-digital converter ADC and processed in said DSP sub-band receiver Rx, thereby both downstream ADC and DSP requirements are significantly reduced through the use of said first tunable local oscillator LO 1.

3. The method of claim 2, wherein to enable upstream transmission an output signal from said first local oscillator LO 1 controller is applied to a second local oscillator LO 2 controller based on which the second local oscillator LO 2 controller determines and fixes a wavelength of a second tunable local oscillator LO 2.

4. The method of claim 3, wherein said wavelength of said tunable local oscillator LO 2 becomes an upstream transmission wavelength $\lambda_{1,US}$, which will be offset in frequency from a downstream wavelength $\lambda_{1,DS}$ by a frequency shift determined by said second local oscillator LO 2 controller.

5. The method of claim 4, wherein to generate a tunable RF signal needed for upstream transmission, outputs of tunable first local oscillator LO 1 and tunable second local oscillator LO 2 are jointly photodetected by a photodiode.

6. The method of claim 5, wherein by beating two tunable laser signals, a tunable RF signal for RF upconversion of an upstream orthogonal frequency-division multiple access OFDMA signal is achieved without requiring an otherwise more costly RF clock source.

7. The method of claim 6, wherein, since a frequency of the tunable RF signal does not have to be pre-determined and does not require manual tuning, operation of said ONU is enabled to become colorless or frequency independent in both radio frequency RF and optical domains.

8. The method of claim 1, wherein step ii) comprises a sub-band digital baseband OFDMA signal being first generated in a digital signal process transmitter DSP Tx and due to baseband digital signal processor DSP signal generation, a DAC being used for digital-to-analog conversion.

9. The method of claim 8, wherein for radio frequency RF upconversion, needed for upstream multi-band orthogonal frequency division multiple access OFDMA operation, an output of a digital-to-analog converter DAC is combined with a radio frequency RF signal output by a radio frequency multiplexer RF mux.

10. The method of claim 9, wherein an upstream optical OFDMA signal is then generated by applying a radio frequency multiplexer RF mux output and applying a tunable local oscillator LO 2 signal output to an optical intensity modulator IM.

11. The method of claim 10, wherein an output of said intensity modulator IM can then be amplified and routed upstream via an ONU circulator.

* * * * *